(12) United States Patent
Dundas et al.

(10) Patent No.: US 9,787,672 B1
(45) Date of Patent: *Oct. 10, 2017

(54) METHOD AND SYSTEM FOR SMARTCARD EMULATION

(71) Applicant: Symantec Corporation, Mountain View, CA (US)

(72) Inventors: Alan Dundas, Los Altos Hills, CA (US); Eirik Herskedal, Fort Wayne, IN (US)

(73) Assignee: Symantec Corporation, Mountain View, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 13/918,326

(22) Filed: Jun. 14, 2013

Related U.S. Application Data

(60) Provisional application No. 61/792,759, filed on Mar. 15, 2013.

(51) Int. Cl.
*H04L 29/06* (2006.01)
*H04L 9/08* (2006.01)
*H04L 9/32* (2006.01)

(52) U.S. Cl.
CPC ............ *H04L 63/0838* (2013.01); *H04L 9/08* (2013.01); *H04L 9/0897* (2013.01); *H04L 9/3247* (2013.01)

(58) Field of Classification Search
CPC ......... H04L 9/08–9/0897; H04L 9/32–9/3202; H04L 9/3226–9/3231; H04L 9/3247–9/3257; H04L 9/3263–9/3268; H04L 9/3271–9/3292; H04L 63/08–63/0892
See application file for complete search history.

(56) References Cited

U.S. PATENT DOCUMENTS

| | | |
|---|---|---|
| 5,557,346 A | 9/1996 | Lipner et al. |
| 5,675,649 A | 10/1997 | Brennan et al. |
| 5,799,086 A | 8/1998 | Sudia |
| 5,920,630 A | 7/1999 | Wertheimer et al. |
| 6,072,876 A * | 6/2000 | Obata et al. .................. 380/286 |
| 6,148,404 A | 11/2000 | Yatsukawa |
| 6,202,150 B1 | 3/2001 | Young et al. |

(Continued)

OTHER PUBLICATIONS

Microsoft Computer Dictionary.—5th ed. ISBN 0-7356-1495-4. Published: 2002.*

(Continued)

*Primary Examiner* — Alexander Lagor
*Assistant Examiner* — Kevin Bechtel
(74) *Attorney, Agent, or Firm* — Wilmer Cutler Pickering Hale and Dorr LLP (57) ABSTRACT

A method and system for emulating a smartcard which includes receiving a one time password and a container PIN for a container, validating the container PIN, upon validating the container PIN, and sending a request to validate the one time password to an authentication server based on a credential ID and a user ID, wherein the request includes the credential ID, the user ID, and the one time password. Upon validation of the one time password by the authentication server, a response is received from the authentication server, and the response includes at least one of: at least a portion of a private key or an authorization to access a at least a portion of the private key stored locally.

15 Claims, 7 Drawing Sheets

(56) References Cited

U.S. PATENT DOCUMENTS

| | | |
|---|---|---|
| 6,253,193 B1 | 6/2001 | Ginter et al. |
| 6,446,206 B1 * | 9/2002 | Feldbaum .................... 713/175 |
| 6,691,232 B1 | 2/2004 | Wood et al. |
| 7,065,210 B1 | 6/2006 | Tsujii et al. |
| 7,568,114 B1 | 7/2009 | Schlafly |
| 7,930,554 B2 | 4/2011 | Coulier et al. |
| 8,296,245 B2 | 10/2012 | Barber et al. |
| 8,340,287 B2 | 12/2012 | Sandhu et al. |
| 8,422,670 B2 | 4/2013 | Shin et al. |
| 8,522,038 B2 | 8/2013 | Lu et al. |
| 9,166,970 B1 | 10/2015 | Dundas et al. |
| 2002/0095507 A1 | 7/2002 | Jerdonek |
| 2002/0178366 A1 | 11/2002 | Ofir |
| 2003/0093585 A1 | 5/2003 | Allan |
| 2003/0093695 A1 | 5/2003 | Dutta |
| 2004/0059952 A1 | 3/2004 | Newport et al. |
| 2005/0223216 A1 * | 10/2005 | Chan et al. .................... 713/153 |
| 2006/0080545 A1 | 4/2006 | Bagley |
| 2006/0230165 A1 | 10/2006 | Zimmer et al. |
| 2007/0033392 A1 | 2/2007 | Ganesan et al. |
| 2007/0189542 A1 | 8/2007 | Alldredge |
| 2007/0282749 A1 | 12/2007 | Nonaka et al. |
| 2011/0258452 A1 * | 10/2011 | Coulier .................. G06F 21/31 713/171 |
| 2012/0066501 A1 | 3/2012 | Xiong |
| 2012/0198228 A1 * | 8/2012 | Oberheide et al. ........... 713/155 |
| 2013/0159707 A1 * | 6/2013 | Jogand-Coulomb ... G06F 21/10 713/164 |
| 2013/0246796 A1 | 9/2013 | Lichtenstadt et al. |

OTHER PUBLICATIONS

USPTO; Office Action for U.S. Appl. No. 13/918,269, mailed Sep. 23, 2013.
Office Action for U.S. Appl. No. 13/918,269 mailed Oct. 31, 2014.
Office Action for U.S. Appl. No. 13/918,269 mailed Apr. 21,2014.
Office Action for U.S. Appl. No. 13/896,504 mailed Jul. 31, 2014.
Office Action for U.S. Appl. No. 13/896,504 mailed Dec. 16, 2014.
U.S. Appl. No. 13/896,504, Advisory Action mailed on Mar. 20, 2015, 3 pages.
U.S. Appl. No. 13/896,504, Notice of Allowance mailed on Jun. 22, 2015, 15 pages.
U.S. Appl. No. 13/918,269, Non-Final Office Action mailed on Sep. 18, 2015, 20 pages.

* cited by examiner

METHOD AND SYSTEM FOR SMARTCARD EMULATION

CROSS-REFERENCE TO RELATED APPLICATIONS

The present application claims the benefit of U.S. Provisional Application No. 61/792,759, entitled AUTHENTICATION OF PKI CREDENTIAL BY USE OF A ONE TIME PASSWORD AND PIN, filed Mar. 15, 2013, the entire content of which is incorporated herein by reference. Further, the present application is related to co-filed U.S. patent application Ser. No. 13/918,269, entitled AUTHENTICATION OF PKI CREDENTIAL BY USE OF A ONE TIME PASSWORD AND PIN, which is assigned to the assignee of the present application.

TECHNICAL FIELD

Embodiments of the present invention relate to user authentication, and particularly to user authentication via a one time password.

BACKGROUND

Enterprises can control user access to enterprise applications, such as web applications, by authenticating users via user credentials, such as a username and password. Enterprises may wish to provide a more secure environment by implementing strong authentication, also known as second-factor authentication. Second-factor authentication requires a user to provide additional evidence of who they are, for example, via Smartcard or other physical token. A Smartcard can store a user's public key certificate and the corresponding private key. Instead of a password, the user provides a personal identification number (PIN) which authenticates the user to the Smartcard. The user's public key certificate is then retrieved from the Smartcard through a secure process and verified to be valid and from a trusted issuer. During the authentication process, a challenge based on the public key contained in the certificate is issued to the card. This challenge verifies that the card is in possession of and can successfully use the corresponding private key. The private key can then be used to decrypt incoming messages and for signing outgoing messages. The public key can then be used to encrypt incoming messages and validate the signatures of outgoing messages. Accordingly, Smartcards allow access to signing and encryption that other two factor authentication solutions may not provide. However, Smartcard implementation can be both costly and logistically difficult for an enterprise to implement. For example, the costs involved can include the costs for the Smartcards, costs for the Smartcard readers and, costs for shipping and storing the Smartcards and the Smartcard readers. Further, logistical difficulties can include restrictions on international shipping of cryptographic devices and retrieval of devices from individuals that are no longer authorized to use them.

Soft certificate solutions typically store public key certificates and corresponding private keys locally on a client device. As such, they do not incur the costs associated with Smartcards. However, soft certificates are not secured by the chip of a Smartcard, and can be vulnerable to potential attacks.

SUMMARY

In one implementation, a system for authenticating via a one time password is described. An example system may receive a request to validate a one time password from a client device, where the request includes a user ID, a credential ID, and the one time password. The system then validates the one time password received from the client device based on the user ID and the credential ID. Upon validating the one time password, the system can send a response to the client device, and the response includes at least one of an authorization to access a private key stored on the client device or at least a portion of the private key.

In one embodiment, the response includes a cloud portion of the private key. In one embodiment, the client device can access a client portion of the private key located on the client device upon receipt of the response. The request to validate the one time password can further include a key ID, wherein validating the one time password can be further based on the key ID.

Upon execution of an initial key generation function by the client device, the system can receive a cloud portion of the private key. At least a portion of the private key can be stored in a container on the client device.

The system can also receive a request from the client device to validate a one time password for importation of at least a portion of the private key, and send a response to the client device indicating that the one time password is valid, wherein the client device is able to import the private key upon receipt of the response.

In one implementation, a method for authenticating via a one time password is described. An example method may include receiving a request to validate a one time password from a client device, wherein the request includes a user ID, the credential ID, and the one time password. The method may also include validating the one time password received from the client device based on the user ID and the credential ID. Upon validating the one time password, the method can also include sending a response to the client device, and the response includes at least one of an authorization to access a private key stored on the client device or at least a portion of the private key.

In one implementation, a non-transitory computer readable storage medium including instructions for authenticating via a one time password is described. An example non-transitory computer readable storage medium includes instructions for a processor that may include receiving a request to validate the one time password from a client device, wherein the request includes a user ID, a credential ID, and the one time password. The instructions can also include validating the one time password received from the client device based on the user ID and the credential ID. Upon validating the one time password, the instructions can also include sending a response to the client device, and the response includes at least one of an authorization to access a private key stored on the client device or at least a portion of the private key.

In one implementation, a system for smartcard emulation is described. An example system may receive a one time password and a container PIN for a container, validate the container PIN, and upon validation of the container PIN, send a request to validate the one time password to an authentication server based on a credential ID and a user ID, wherein the request comprises the credential ID, the user ID, and the one time password. Upon validation of the one time password by the authentication server, the system can receive a response from the authentication server, the response including at least one of: at least a portion of a private key or an authorization to access at least a portion of the private key stored locally.

In one embodiment, the response can include a cloud portion of the private key. In one embodiment, a client portion of the private key stored locally is accessible upon receipt of the response. The request to validate the one time password can be further based on a key ID, and the request further can include the key ID.

The system can further execute an initial key generation function, and send a cloud portion of the private key to the authentication server. At least a portion of the private key can be stored locally in the container.

The system can further send a request to the authentication server to validate a one time password for importation of at least a portion of the private key, and receive a response from the authentication server indicating that the one time password is valid, wherein importation of the at least a portion of the private key is permitted upon receipt of the response.

In one implementation, a method for smartcard emulation is described. The method can include receiving a one time password and a container PIN for a container, validating the container PIN, and upon validation of the container PIN, sending a request to validate the one time password to an authentication server based on a credential ID and a user ID, wherein the request comprises the credential ID, the user ID, and the one time password. The method can also include, upon validation of the one time password by the authentication server, receiving a response from the authentication server, the response including at least one of: at least a portion of a private key or an authorization to access at least a portion of the private key stored locally.

In one implementation, a non-transitory computer readable storage medium for smartcard emulation is described. The non-transitory computer readable storage medium can include instructions for a processing device that can include receiving a one time password and a container PIN for a container, validating the container PIN, and upon validation of the container PIN, sending a request to validate the one time password to an authentication server based on a credential ID and a user ID, wherein the request comprises a credential ID, a user ID, and the one time password. Upon validation of the one time password by the authentication server, the instruction can include receiving a response from the authentication server, the response including at least one of: at least a portion of a private key or an authorization to access at least a portion of the private key stored locally.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments are directed to a method and system for authentication of PKI credentials by use of a one time password (OTP). PKI (public key infrastructure) credentials can include a user's public key certificate and corresponding private key. Accordingly to some aspects of the present disclosure, at least a portion of the PKI credentials is stored on a client device in a secured fashion, and additional protection of the PKI credentials is provided using an additional computing device referred to herein as a registered device.

In one embodiment, an authentication server receives from a client device a request to validate an OTP generated by a registered device based on a user ID entered by a user, a credential ID, and, optionally, a key ID of a private key. The authentication server can then validate the OTP from the client device based on the user ID, the credential ID, and, optionally, the key ID. Upon validating the OTP, the authentication server can send a response to the client device indicating an authorization to access the complete private key or a portion of the private key. Alternatively, the response can include the complete private key or a portion of the private key.

In one embodiment, a client device receives an OTP and a PIN for a container on the client device. The client device validates the PIN for the container and sends a request to an authentication server to validate the OTP, including a credential ID, a user ID, and, optionally, a key ID. The client device then receives a response from the authentication server that includes authorization to access a complete private key or a portion of the private key. Alternatively, the response includes the complete private key or a portion of the private key.

In one embodiment, an alternative to a Smartcard authentication is provided that uses a split private key, where one portion of the private key is located on a client device and the other portion of the private key is maintained in the cloud and is retrieved by use of an OTP. In other words, the OTP is bound to the cloud portion of the private key. Specifically, the response from the authentication server that indicates the validity of the OTP can include a cloud portion of the private key. Together with a local PIN, this system simulates Smartcard functionality and provides the benefits of a Smartcard with access to PKI functions (e.g., decrypting incoming messages and signing outgoing messages) without some of the detriments of physical Smartcards, such as cost and logistical challenges. Here, users provide two factor authentication credentials, via both a user login and the OTP, to get the encryption and signing capabilities associated with PKI technology without the inventory, material, shipping, logistics and trade compliance costs associated with Smartcards.

Embodiments of this system can also provide increased protection against many of the vulnerabilities of "soft" credentials (credentials that are stored on a networked computer and not a Smartcard) by including the use of the OTP requirement. For example, if a soft credential is stored as part of a virtual machine image and a clone is made of this image, two copies of the soft credential are then available to be independently used. However, since the OTP is bound to the PKI credential, though the client portion of the private key can be reproduced in an unauthorized fashion, the use of the client portion of the private key is dependent on demonstration of possession of the OTP bound credential to access the cloud portion of the private key to complete a PKI function.

In another example, if a client device has malicious malware installed (e.g., a key logger), the key logger will not be able to effectively capture the OTP needed to unlock and access the PKI credential. Though the OTP can be captured once, because it is a one use passcode, the captured OTP cannot be used again later.

Figure 1:
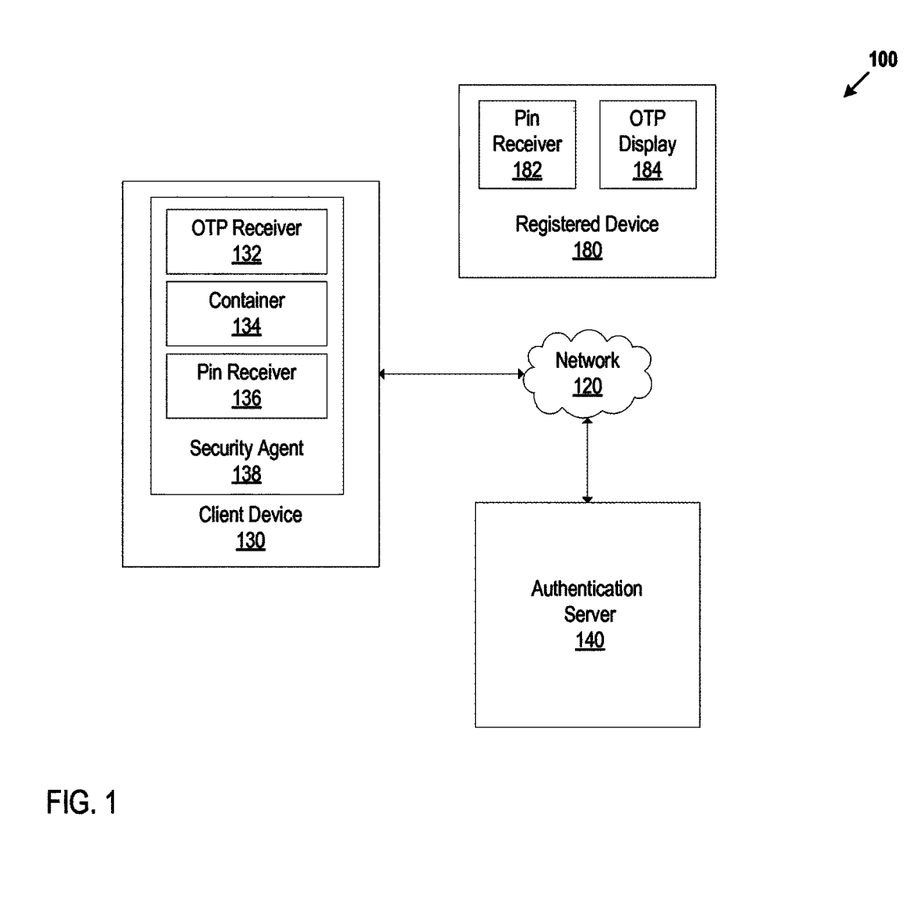
FIG. 1 illustrates a network architecture in which embodiments may operate.

FIG. 1 is one embodiment of a network architecture 100 in which embodiments of the present invention can be implemented. The network architecture 100 can include a registered device 180, and an authentication server 140 and a client device 130 which are connected via a network 120. The network 120 can be a local area network (LAN), a wireless network, a mobile communications network, a wide area network (WAN), such as the Internet, or similar communication system. The network 120 can include any number of networking and computing devices such as wired and wireless devices.

The authentication server 140 and the client device 130 can be any type of computing device including server computers, gateway computers, desktop computers, laptop computers, hand-held computers or similar computing devices. The registered device 180 can be any type of mobile device including tablet computers, mobile phones, smart phones, hand-held computers, or similar computing devices. Alternatively, the registered device 180 can also be a separate hardware device that has a specific function to generate an OTP (e.g., a secureID card or a Symantec VIP hardware token). The client device 130 and the registered device 180 may have a common user who may be an employee of an organization. For example, the client device 130 may be a personal computer of user A and the registered device 180 may be a mobile phone of user A. The authentication server 140 may provide authentication services for the organization that may involve authenticating users and/or user devices that attempt to access resources (e.g., data stores, physical devices, services, etc.) associated with the organization. These resources may be part of the organization's network (a private cloud) or part of a public cloud (computing resources provided to the organization by a third party). The authentication server 140 may be part of the private cloud or the public cloud. When the client device 130 and the registered device 180 are registered with the authentication server 140, each of them can be assigned a credential ID (e.g., a unique security code associated with an individual device). The authentication server 140 can associate these credential IDs with a particular user and a user ID of that user.

The client device 130 can include a security agent 138 that simulates Smartcard functionality. As will be discussed in more detail below, the security agent 138 can include a container 134 that stores PKI credentials in a secure fashion, and an OTP receiver 132 and PIN receiver 136 that facilitate input of additional credentials to ensure enhanced protection for the PKI credentials. The OTP receiver 132 may facilitate user input of an OTP provided to the user via the registered device 180, and the PIN receiver 136 may facilitate user input of a PIN previously associated with the container 134.

As discussed above, the OTP can be provided to the user via the registered device 180, which has been registered to the user and this registration (e.g., a credential ID of the registered device) is stored at the authentication server. In particular, in one embodiment, the registered device 180 may include a PIN receiver 182 (a user interface (UI) or a UI element) that can receive a PIN from the user, e.g., from the user's recollection. For example, the registered device could be a mobile phone with an application for receiving a PIN. Here, the user could open the application and enter the PIN in a portion of a user interface of the application, where the PIN can be a series of numbers of a certain length (e.g., 4, 6, or 8 digits) that may have other requirements (e.g., no repeating numbers).

Once the registered device 180 verifies that the correct PIN has been entered (e.g., via the application on the mobile phone), the registered device 180 generates an OTP (e.g., via the application on the mobile phone) and displays the OTP on an OTP display 184 on the registered device 180. Further to the example above, the user interface of the application on the mobile phone can have a portion for display of the OTP. In one embodiment, the OTP is only valid for a certain period of time (e.g., 30 seconds or 60 seconds) and the OTP can be generated by an OTP generating algorithm using a seed stored on the registered device 180 and a clock time. After the validity of the OTP expires, a new OTP may be displayed or the user may have to enter the PIN again to receive a new OTP.

In other embodiments, the OTP can be generated remotely, for example, by the authentication server 140, and sent to the mobile phone via SMS, or the OTP can be generated on a dedicated registered device, which may or may not require the entry of a PIN to receive the OTP.

As discussed above, the security agent 138 of the client device 130 can include the OTP receiver 132 that facilitates user input of the OTP. Upon receiving the OTP (e.g., by manual entry by the user), the security agent 138 sends a request to validate the OTP to the authentication server 140 via the network 120, which includes the OTP along with a credential ID (e.g., the credential ID of the registered device 180, the client device 130, or both), and/or the user ID of the user of the client device 130. For example, an administrator can have previously associated the user ID with the credential IDs of the registered device 180 and the client device 130 at the authentication server 140 or the user ID can have been associated with the credential IDs through an enrollment process. Further to the example above, the client device can be a laptop computer, and the user can enter first-factor credentials, such as a user ID and password, along with the OTP from the mobile phone in the OTP receiver on the laptop to be sent to the authentication server along with a credential ID.

Once the authentication server 140 receives the OTP from the security device 138, the authentication server 140 can verify that the OTP received from the client device 130 is correct. For example, because the registered device 180 is registered to the user and the user has been identified by the entered user ID, the authentication server 140 can access a seed corresponding to the seed on the registered device 180 and, based on the OTP generating algorithm, determine whether the entered OTP is correct. In one embodiment, the authentication server 140 also confirms whether the OTP was received during the time period that the OTP was valid. Further to the example above, the authentication server can receive the OTP from the user's laptop computer and confirm that it was the same OTP that was generated on the user's mobile phone. Further, the authentication server can confirm that the OTP was received in the time period that the OTP was valid (e.g., 30 seconds).

In one embodiment, the user of the client device 130 can also be prompted to enter a PIN into the PIN receiver 136, which can be validated locally on the client device 130 prior to or in conjunction with the sending of the request to validate the OTP. For example, this PIN can be entered in a separate portion of the user interface or may be entered either before or after the OTP in the OTP receiver 136. A PIN policy defining requirements for the PIN (e.g., PIN length, no repeating digits, entered before or after the OTP, etc.) can be maintained by the security agent 138. Further to the example above, the user can enter a PIN, e.g., from the user's recollection, into a PIN receiver as well as entering the OTP in the OTP receiver on the laptop computer.

In one embodiment, the authentication server 140 also receives a key ID from the security agent 138. For example, a key ID can be associated with a private key to identify the particular private key being used in instances where more than one private key is associated with a particular user. A user may have multiple certificates or multiple "smart cards", each with a corresponding key ID. Also, the key ID could be selected a number of ways. The client could select a specific key ID (e.g., designated by an administrator) or could provide a selection of list of certificates, after which the user selects a particular certificate and then the client sends the corresponding key ID associated with the selected certificate.

If the authentication server 140 receives the correct OTP within the time that the OTP is valid, then the authentication server 140 sends a response to the client device 130 such that the client device 130 can access the contents of the container 134 (e.g., the user's public key certificate and private key). In one example, the authentication server 140 can also confirm that the received credential ID was associated with the received user ID.

In one embodiment, the private key is split such that a portion (e.g., a cloud portion) is stored in the authentication server 140, and another portion (e.g., a client portion) is stored in the container 134. The container 134 can be, for example, Cryptographic Service Provider (CSP) container or Public-Key Cryptography Standards #11 (PKCS#11) container). In another example, the container 134 can represent secure storage (e.g., Trusted Platform Module (TPM) or Identity Protection Technology (IPT)). Here, the response from the authentication server 140 after validation of the OTP includes the cloud portion of the private key. Further, the response can include an indication to the client device 130 to unlock the container 134, so that the client device 130 can access the client portion of the private key. In one embodiment, the client device also requires a local validation of the correct PIN entered in the pin receiver 136 prior to permitting access to the client portion of the private key.

In one embodiment, the private key is stored principally on the authentication server 140, rather than having a portion stored on the client device 130. Here, the response from the authentication server 140 to the client device 130 includes the private key.

In one embodiment, the private key is stored principally on the client device 130, rather than having a portion stored on the authentication server 140. Here, the response from the authentication server 140 to the client device 130 does not include the private key, but does include an indication that it is permissible for the client device 130 to access the private key stored on the client device 130.

In one embodiment, either the sending of the private key and/or access to the container 134 is also based on the key ID. For example, if multiple private keys are being used by a particular user, the user is only granted sent and/or granted access to the private key corresponding to the key ID.

Once the client device has received at least a portion of the private key and/or access to the container 134, the client device 130 can use the private key to execute PKI functions. Further to the example above, the laptop computer receives the cloud private key portion, combines it with the client private key portion stored in the container 134, and uses the resulting private key to decrypt incoming messages (e.g., email messages, HTTP responses, etc.).

In one embodiment, the container 134 is established on the client device 130 the first time the user uses the client device 130 with an OTP (e.g., a key generation or enroll function). Here, the security agent 138 can prompt the user of the client device 130 to enter the credential ID of the registered device 180. Then, the user will be prompted to enter a first OTP, for example, retrieved from the registered device 180, and the user will be prompted to enter a second OTP, for example, retrieved at a later time from the registered device 180. The authentication server 140 then receives a request from the security agent 138 to validate the first and second OTPs including the user ID, a credential ID (e.g., a credential ID of the registered device 180 and/or the client device 130), and/or a key ID. In one embodiment, after the authentication server 140 has validated the first and second OTPs, the establishment of the container 134 on the client device will be completed. In one embodiment, the user can then be prompted to establish a PIN for the container 134. For example, the PIN for the container 134 can be a different PIN from the PIN used for the registered device 180. However, in one embodiment, the PIN must comply with a PIN policy on the client device 130.

In one embodiment, the security agent 138 can further generate a private key for the user using, for example, a suitable random number generator. Further, the security agent 138 can send a request, including a public key in a signed object by the private key, to a certificate authority for verification of the possession of the private key and attachment of user information to be placed into a certificate. The certificate authority can return a certificate signed by the private key of the certificate authority or private key that chains to the certificate authority with the user information attached along with a public key certificate that includes a public key associated with the user by the certificate authority. Once the verified private key is received from the certificate authority, the certificate can be stored in the container 134 for use for PKI functions. As described above, either the private key or a portion (e.g., a client portion) of the private key can be stored in the container 134. If the client portion of the private key is stored on the client device 130, then the cloud portion 140 of the private key is sent to the authentication server 140 to be stored.

In one embodiment, the private key or the client portion of the private key can be securely placed in an export file (e.g., a .glck file) along with a bound credential ID and user ID for export to a different client device. For example, the user can be prompted to enter a valid OTP (and optionally a PIN) in order for the private key or client portion of the private key to be placed in the export file. Once the authentication server 140 validates the OTP (and optionally the PIN), the private key or client portion of the private key is placed in the export file. Further, a PIN policy can also be placed in the export file, but not the actual PIN. Here, the export file is protected from brute force attacks because the OTP from the registered device 180 is needed to gain access to the export file. For example, the user enters a valid OTP from the registered device 180 to import the export file on to a new client device. When the authentication server 140 has authenticated the OTP, the cloud portion is not returned, but the client portion located in the export file is securely stored in the new container along with the PIN policy and bound credential ID information so that it is ready for future use as described above.

In one embodiment, lifecycle management of the private key (e.g., exchange, replacement, and renewal of the private key) can also be bound to the entry of a valid OTP (and optionally a PIN).

Figure 2:
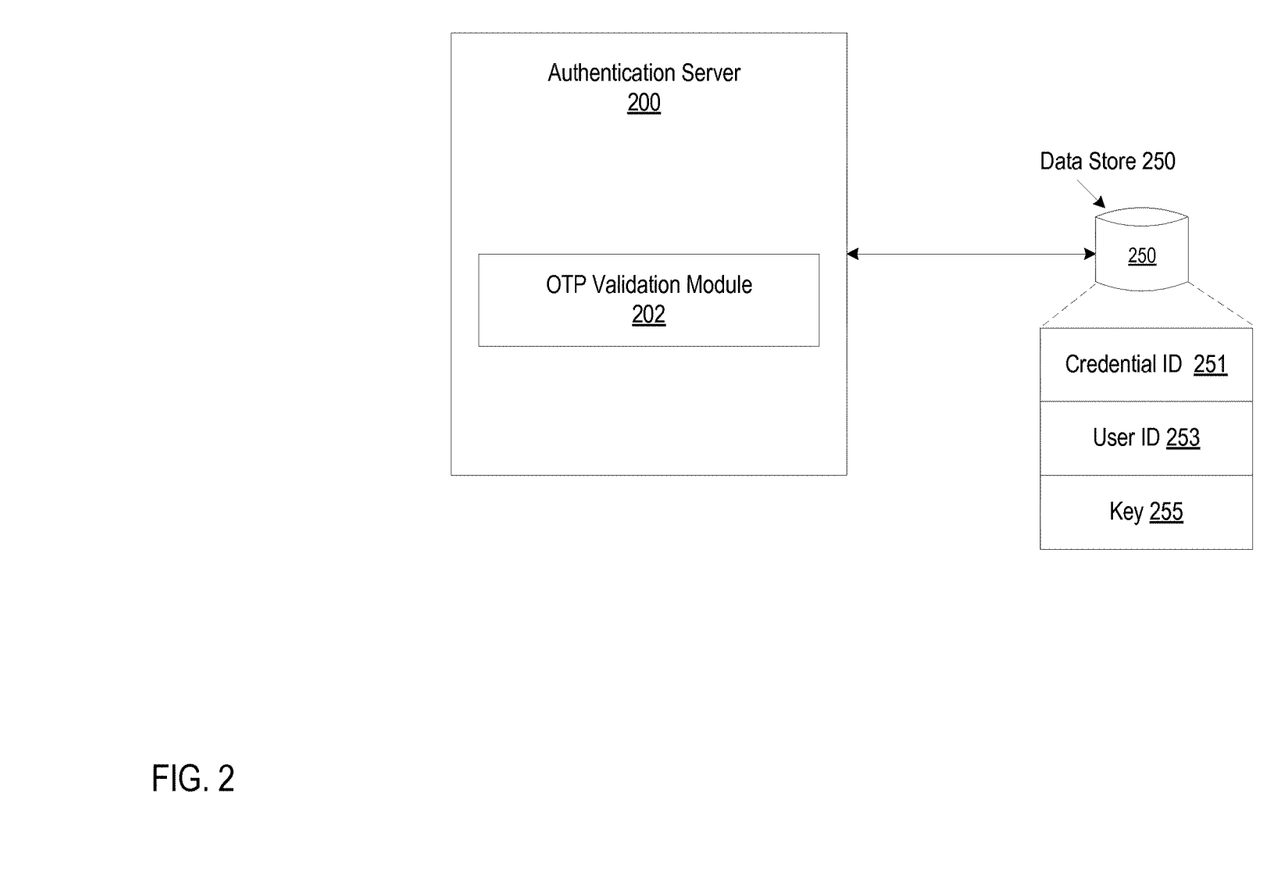
FIG. 2 illustrates a block diagram of an authentication server of one embodiment.

FIG. 2 is a block diagram of an authentication server 200 and a data store 250 according to one embodiment. The authentication server 200 may be the same as the authentication server 140 in FIG. 1. The authentication server 200 includes an OTP validation module 202, which can be separated in further sub-modules, according to a particular embodiment. The data store 250 includes a credential ID database 251, a user ID database 253, and a key database 255.

The data store 250 can be a persistent storage unit. A persistent storage unit can be a local storage unit or a remote storage unit. Persistent storage units can be a magnetic storage unit, optical storage unit, solid state storage unit, electronic storage unit (main memory), or similar storage unit. Persistent storage units can be a monolithic device or a distributed set of devices. A 'set', as used herein, refers to any positive whole number of items.

The user enters an OTP generated by a registered device (e.g., a mobile phone or a dedicated OTP generating device) in an application on a client device (e.g., a laptop computer or desktop computer) that has been bound to the credential ID of the registered device, which is recorded in a credential ID database 251 in the data store 250. In one embodiment, the user is also prompted to enter a PIN (e.g., a client device PIN), which can be different from a PIN entered on the registered device to retrieve the OTP, which is locally validated (e.g., prior to any requests being sent). A request is sent to the authentication server 200 along with a user ID of the user and a credential ID. For example, the user may have been prompted to enter a user ID and/or password to access the application. Here, the user has previously established the user ID and/or password to access the application, and the user ID and/or password have been stored in a user ID database 255 along with an association with the credential ID. In one embodiment, the request also includes a key ID for identifying a particular private key.

Upon receipt of the OTP, the OTP validation module 202 validates the OTP via an algorithm by using the credential ID to determine a corresponding seed to use in the algorithm. The OTP validation module 202 can also confirm that the credential ID is associated with the user ID.

Upon validation of the OTP by the OTP validation module, the OTP validation module 202 sends a response to the client device indicating that the OTP is valid so that the private key can be accessed. If the private key or a cloud portion of the private key was stored in a key database 255 of the data store 250, then the response also includes the private key or the cloud portion of the private key. For example, the private key or cloud portion of the private key can correspond to the key ID included in the request. If the private key was not stored in the data store 250 or if a client portion of the private key was stored on the client device, then the response indicates that the client device is permitted to access the private key or the client portion of the private key on the client device. Once the private key is accessible to the client device, the client device is able to use the private key to perform PKI functions.

Figure 3A:
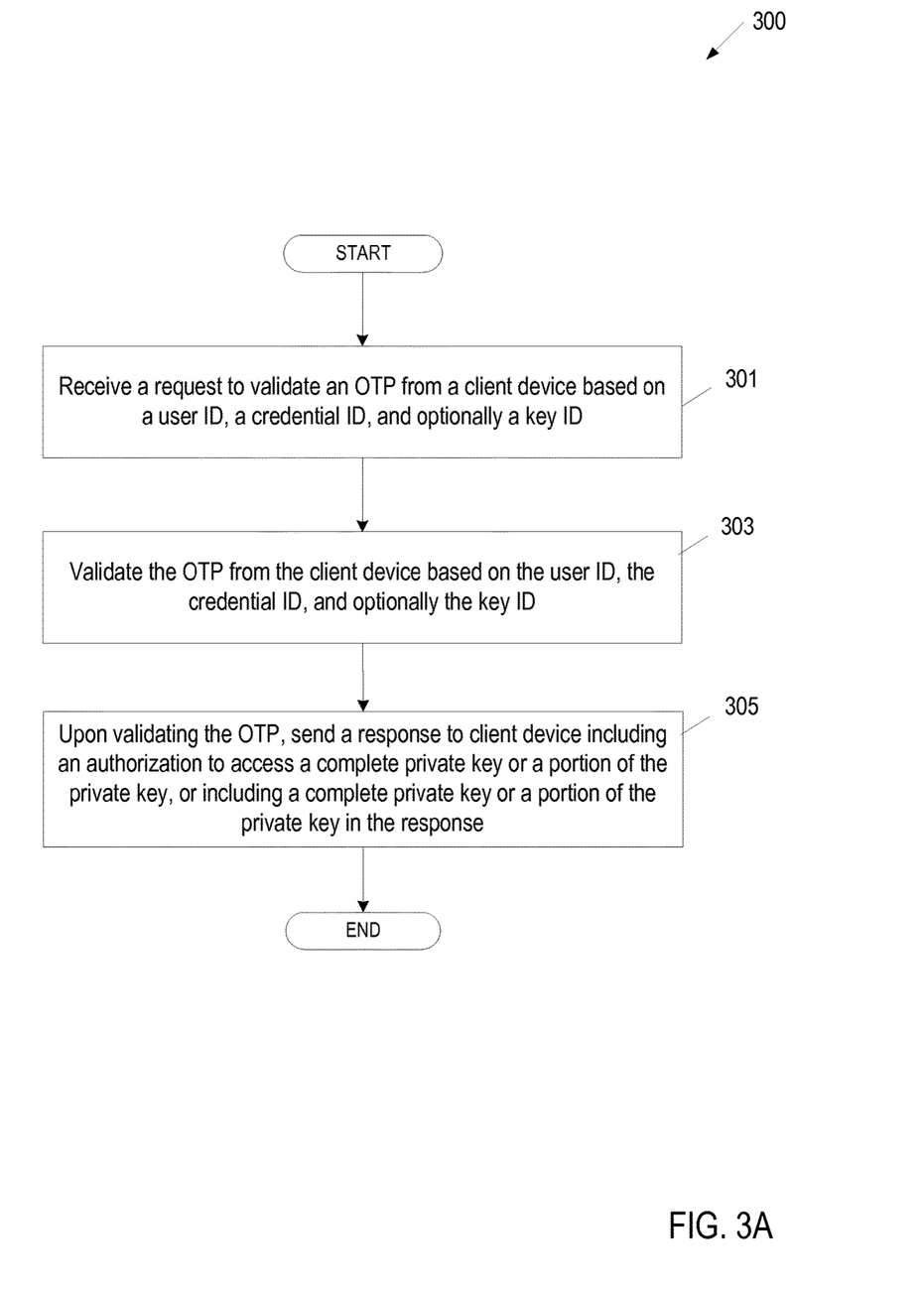
FIG. 3A is a flow diagram of a server-side method of authentication of one embodiment.

FIG. 3A is a flow diagram of an embodiment of a server-side method of authentication. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the authentication server 200 of FIG. 2.

At block 301, an authentication server receives a request from a security agent on a client device to validate an OTP, wherein the request includes a user ID and the OTP from a client device. The request can also include a credential ID of the registered device and/or the client device, which can be bound to the user ID. The request can optionally include a key ID that identifies a particular key desired.

At block 303, the authentication server validates the OTP received from the client device based on the user ID, the credential ID, and, optionally, the key ID. For example, the authentication server can confirm that the OTP is valid via an algorithm. Further, the authentication server confirms that the OTP was received within the time period that the OTP was valid.

At block 305, upon validating the OTP, the authentication server sends a response to the client device indicating that the OTP is valid, wherein the client device is able to access a private key upon receipt of the response. For example, if the private key or a cloud portion of the private key was stored at the authentication server, then the response also includes the private key or the cloud portion. If the private key was not stored at the authentication server or if a client portion of the private key was stored on the client device, then the response indicates that the client device is permitted to access the private key on the client device or the client portion of the private key. Once the private key is accessible to the client device, the client device is able to use the private key to perform PKI functions.

Figure 3B:
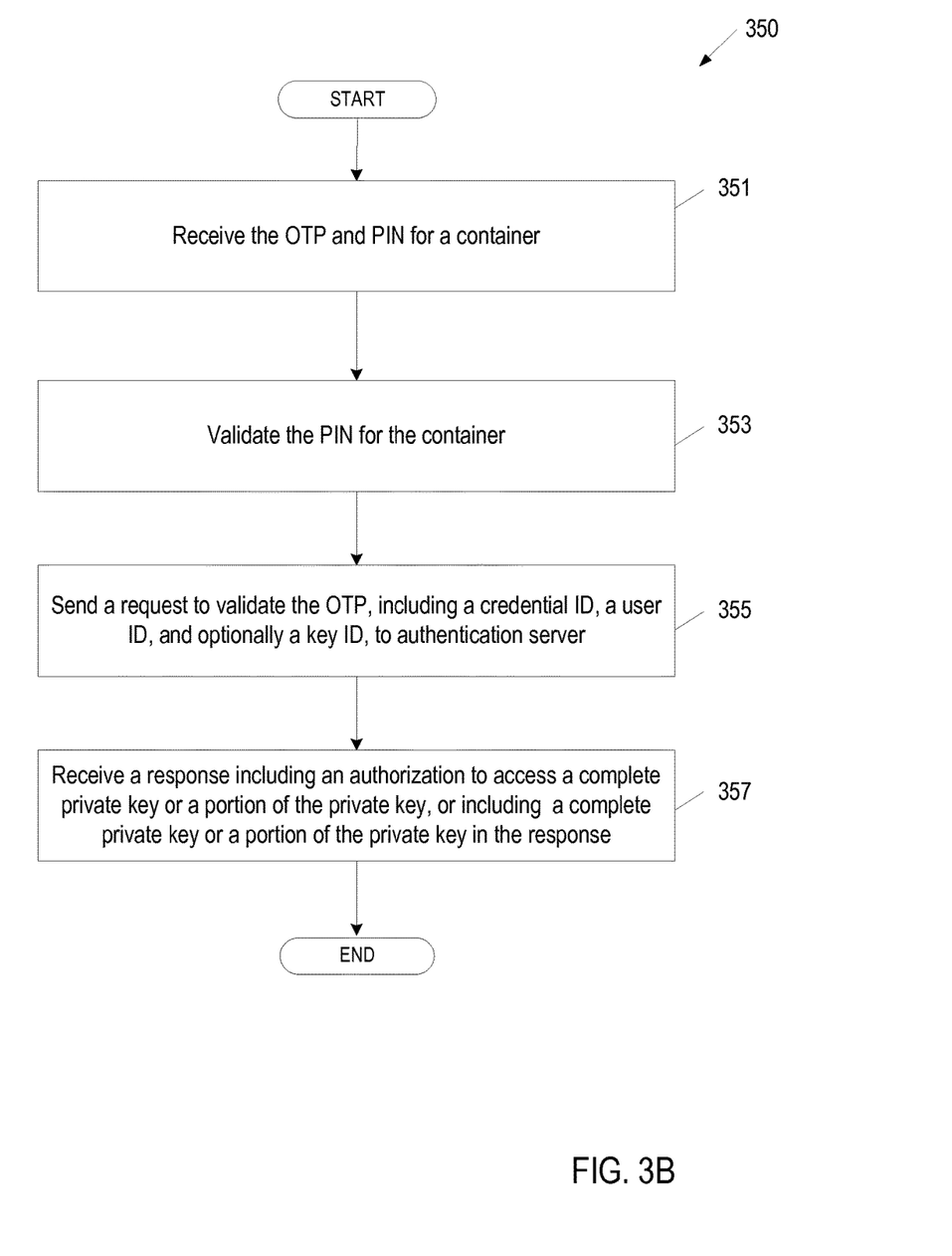
FIG. 3B is a flow diagram of a client-side method of authentication of one embodiment.

FIG. 3B is a flow diagram of an embodiment of a client-side method of authentication. Method 350 can be performed by processing logic that can comprise hardware (e.g., circuitry, dedicated logic, programmable logic, microcode, etc.), software (e.g., instructions run on a processing device), or a combination thereof. In one embodiment, method 350 is performed by the security agent 138 of FIG. 1.

At block 351, a security agent on a client device receives an OTP and a PIN for a container. For example, the user retrieves the OTP from a registered device and enters the OTP in the security agent on the client device. The user also enters the PIN for the container from the user's recollection.

At block 353, the security agent validates the PIN for the container. In one embodiment, if the PIN is not valid, then the user is not able to proceed until the correct PIN has been entered.

At block 355, the security agent sends a request to an authentication server to validate the OTP that includes the OTP, a credential ID of the registered device and/or the client device, a user ID and the PIN. The request can optionally include a key ID.

At block 357, if the authentication server validates the OTP, then the security agent receives a response from the authentication server indicating that the OTP is valid. For example, the response can include an authorization to access a private key (e.g., a complete private key) or a portion (e.g., a client portion) of the private key. In one embodiment, the response can include the private key (e.g., a complete private key) or a portion (e.g., a cloud portion) of the private key.

Figure 4A:
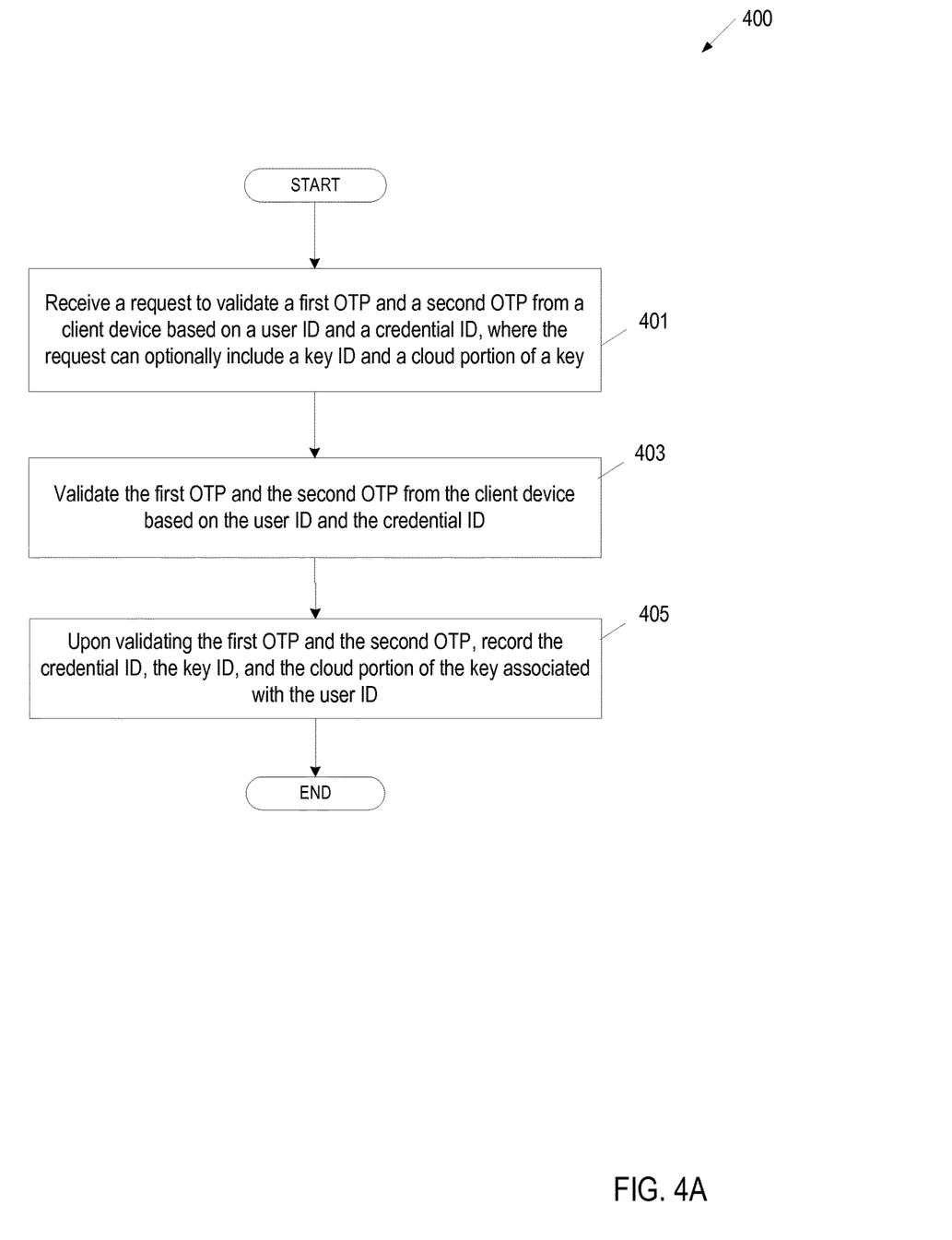
FIG. 4A is a flow diagram of a server-side method of client registration of one embodiment.

FIG. 4A is a flow diagram of a server-side method of client registration of one embodiment. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the authentication server 200 of FIG. 2.

At block 401, an authentication server receives from a security agent on a client device a request to validate a first OTP and a second OTP based on a credential ID of a registered device and/or the client device and a user ID of the client device, where the request can optionally include a key ID. In one embodiment, the request includes a private key or a cloud portion of a private key.

At block 403, the authentication server validates the first OTP and the second OTP based on the user ID and the credential ID.

At block 405, upon validating the first OTP and the second OTP, the authentication server records the credential ID and optionally the key ID. In one embodiment, the authentication server stores the private key or a cloud portion of the private key associated with the credential ID and/or the user ID for future access by the client device for PKI functions.

Figure 4B:
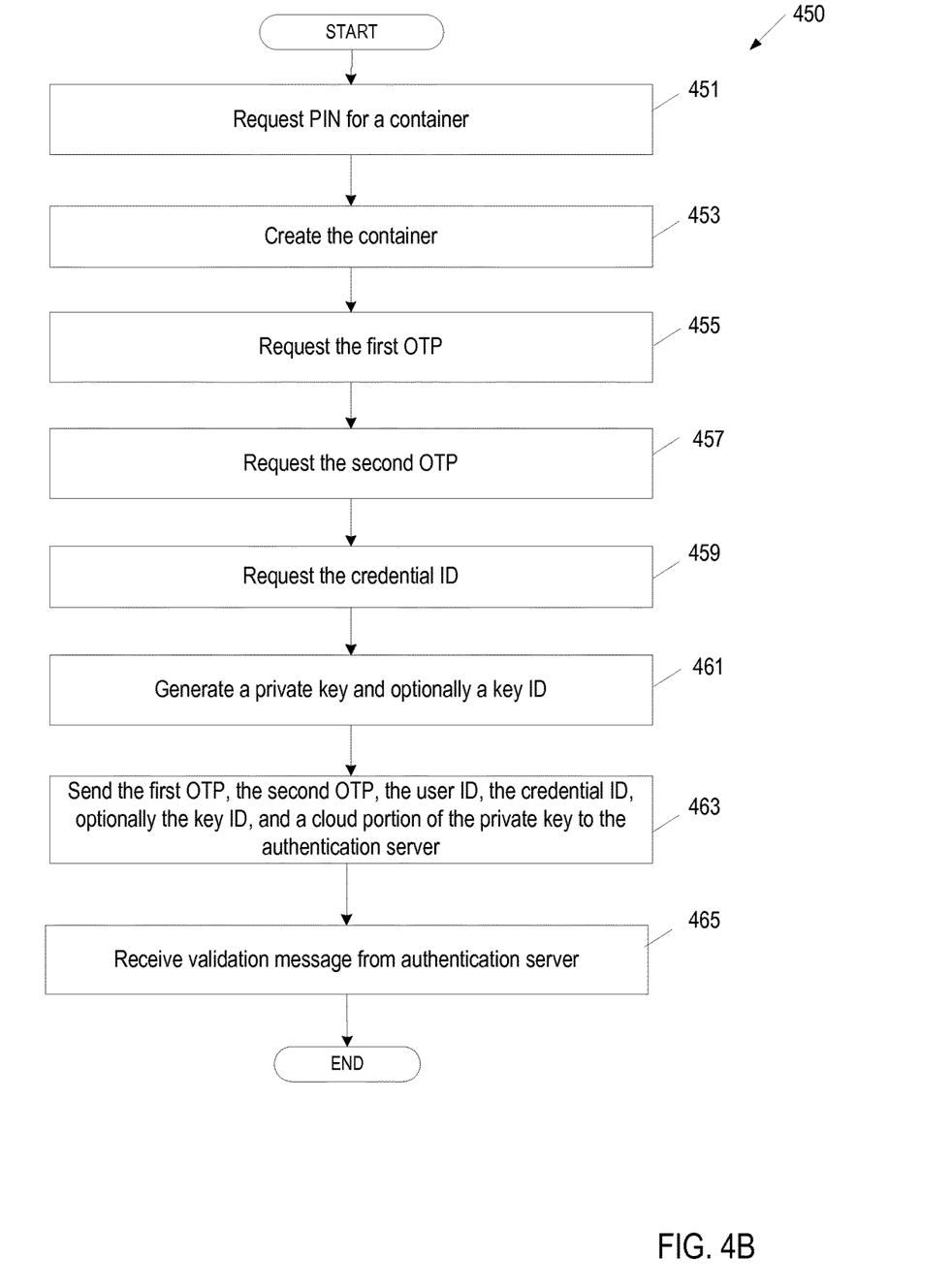
FIG. 4B is a flow diagram of a client-side method of client registration of one embodiment.

In one embodiment, as part of a key generation phase, the authentication server receives a user ID, a credential ID, an OTP, and a private key or a cloud portion of the private key that has been generated by the client device. In one embodiment, the authentication server does not receive a private key or a portion of the private key FIG. 4B is a flow diagram of a client-side method of certificate enrollment of one embodiment. Method 450 can be performed by processing logic that can comprise hardware (e.g., circuitry, dedicated logic, programmable logic, microcode, etc.), software (e.g., instructions run on a processing device), or a combination thereof. In one embodiment, method 450 is performed by the security agent 138 of FIG. 1.

At block 451, a security agent on a client device requests a PIN for a container (e.g., a container for a private key) from a user. At block 453, the security agent creates the container, e.g., to contain a private key or a portion of a private key.

At block 455, the security agent requests a first OTP. For example, the user retrieves a first OTP from a registered device and enters the first OTP on the security agent on the client device.

At block 457, the security agent requests the second OTP. For example, the user retrieves a second OTP from a registered device at a later time and enters the second OTP on the security agent on the client device.

At block 459, the security agent requests a credential ID of the registered device and/or the client device. For example, the user can enter the credential ID of the registered device into the security agent.

At block 461, the security agent generates a private key and, optionally, a key ID for the private key.

At block 463, the security agent sends the first OTP, the second OTP, the credential ID, the user ID and, optionally, the key ID to an authentication server, which stores this information to facilitate future use of the private key. In one embodiment, the security agent also sends a cloud portion of the private key to the authentication server, and a client portion is stored locally in the container on the client device. However, in one embodiment, the security agent can send principally the entire private key. In one embodiment, the security agent does not send the private key, and principally the entire private key is stored on in the container the client device.

At block 465, the security agent receives a validation message from the authentication server if the first OTP and the second OTP are valid which completes the key generation and enrollment phase. If the first OTP and the second OTP are not valid, then the security agent does not receive a validation message. In one embodiment, the private key or a client portion of the private key is associated with the credential ID and/or the user ID for future access by the client device for PKI functions.

Figure 5:
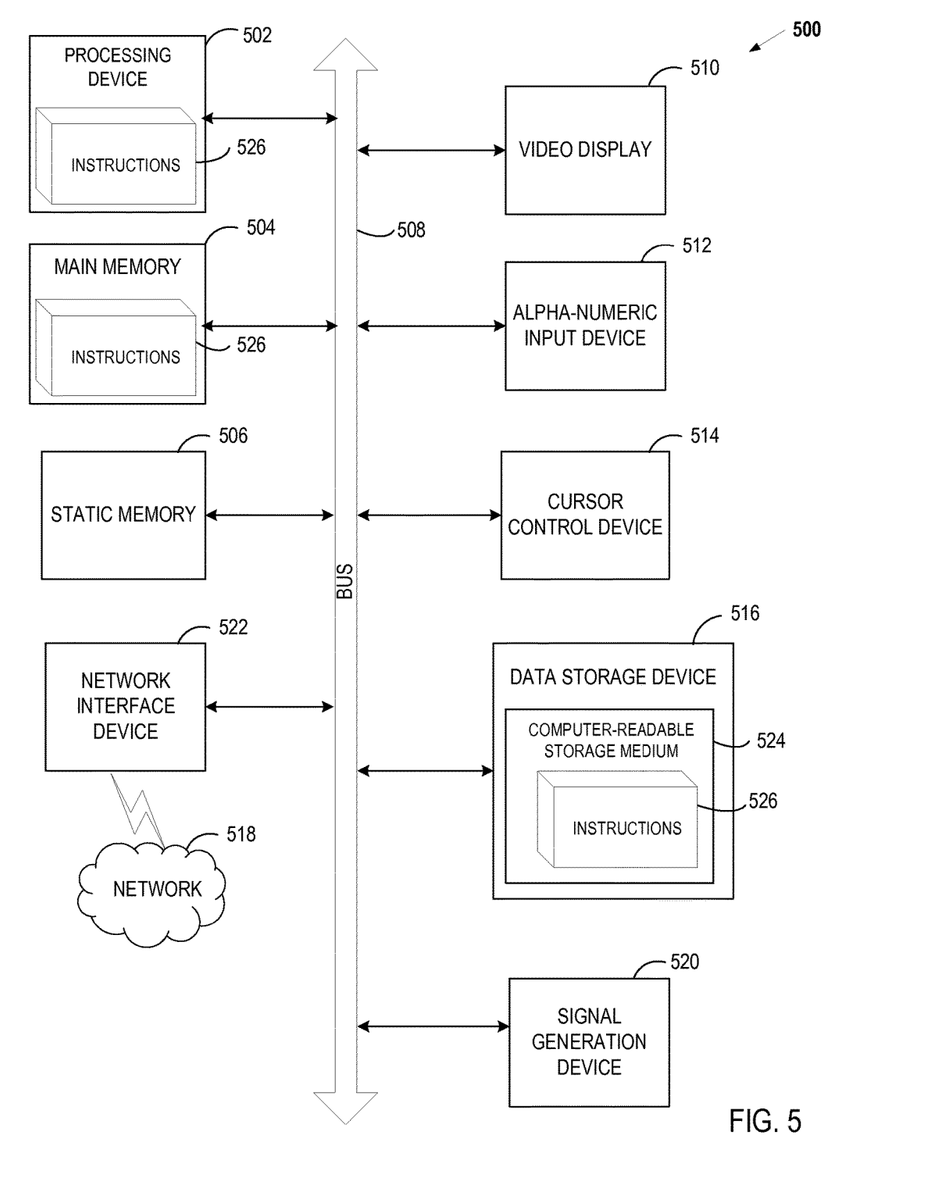
FIG. 5 is a diagram of one embodiment of a computer system that may perform one or more of the operations described herein.

FIG. 5 is a diagram of one embodiment of a computer system for providing a dynamic framework for certificate application configuration. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media. The instructions 526 may further be transmitted or received over a network 518 via the network interface device 522.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein (for example in relation to FIG. 2) can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a security agent on a client device, a one-time password and a container PIN for a container, wherein the one-time password is generated at a device registered with the client device and entered into the security agent on the client device;
validating, by the security agent on the client device, the container PIN;
sending, by the security agent on the client device upon validation of the container PIN, a request to validate the one-time password to an authentication server, wherein the request comprises the one-time password, a credential ID associated with the registered device, a key ID associated with a private key, and a user ID associated with a user;
receiving, by the security agent on the client device upon validation of the one-time password by the authentication server, a response from the authentication server, the response comprising a cloud portion of the private key identified via the key ID and an authorization to access a container portion of the private key stored locally in the container;

combining the cloud portion of the private key with the container portion of the private key to construct the private key;

sending, by the security agent on the client device to the authentication server, a request to validate a second one-time password, wherein validation of the second one-time password by the authentication server authorizes exportation of the container portion of the private key from the container to a second device;

receiving, by the security agent on the client device, a response from the authentication server indicating that the second one-time password is valid, wherein exportation of the container portion of the private key to the second device is permitted upon receipt of the response; and exporting, from the security agent on the client device to the second device, the container portion of the private key.

2. The method of claim 1 further comprising:

executing an initial key generation function; and sending the cloud portion of the private key to the authentication server.

3. The method of claim 1, further comprising:

sending a request to the authentication server to validate a third one-time password for importation of the container portion of the private key from a device into the container; and receiving a response from the authentication server indicating that the third one-time password for importation of the container portion of the private key is valid, wherein importation of the container portion of the private key from the device is permitted upon receipt of the response.

4. The method of claim 1, wherein the key ID is one of a plurality of key IDs associated with the user ID.

5. The method of claim 1, wherein a pin policy defining requirements for the pin is exported with the container portion of the private key.

6. A system comprising:

a hardware memory; and a security agent on a client device coupled to or containing the hardware memory, the security agent configured to:

receive, by the security agent on the client device, a one-time password and a container PIN for a container, wherein the one-time password is generated at a device registered with the client device and entered into the security agent on the client device;

validate, by the security agent on the client device, the container PIN;

send, by the security agent on the client device upon validation of the container PIN, a request to validate the one-time password to an authentication server, wherein the request comprises the one-time password, a credential ID associated with the registered device, a key ID associated with a private key, and a user ID associated with a user;

receive, by the security agent on the client device upon validation of the one-time password by the authentication server, a response from the authentication server, the response comprising a cloud portion of the private key identified via the key ID and an authorization to access a container portion of the private key stored locally in the container;

combine the cloud portion of the private key with the container portion of the private key to construct the private key;

send, by the security agent on the client device to the authentication server, a request to validate a second one-time password, wherein validation of the second one-time password by the authentication server authorizes exportation of the container portion of the private key from the container to a second device;

receive, by the security agent on the client device, a response from the authentication server indicating that the second one-time password is valid, wherein exportation of the container portion of the private key to the second device is permitted upon receipt of the response; and export, from the security agent on the client device to the second device, the container portion of the private key.

7. The system of claim 6, wherein the security agent is further configured to:

execute an initial key generation function; and send the cloud portion of the private key to the authentication server.

8. The system of claim 6, wherein the processing device security agent is further configured to:

send a request to the authentication server to validate a third one-time password for importation of the container portion of the private key from a device into the container; and receive a response from the authentication server indicating that the third one-time password for importation of the container portion of the private key is valid, wherein importation of the container portion of the private key from the device is permitted upon receipt of the response.

9. The system of claim 6, wherein the key ID is one of a plurality of key IDs associated with the user ID.

10. The system of claim 6, wherein a pin policy defining requirements for the pin is exported with the container portion of the private key.

11. A non-transitory computer readable storage medium comprising instructions that, when executed by a security agent on a client device, cause the security agent to perform a set of operations comprising:

receiving, by the security agent on the client device, a one-time password and a container PIN for a container, wherein the one-time password is generated at a device registered with the client device and entered into the security agent on the client device;

validating, by the security agent on the client device, the container PIN;

sending, by the security agent on the client device upon validation of the container PIN, a request to validate the one-time password to an authentication server, wherein the request comprises the one-time password, a credential ID associated with the registered device, a key ID associated with a private key, and a user ID associated with a user;

receiving, by the security agent on the client device upon validation of the one-time password by the authentication server, a response from the authentication server, the response comprising a cloud portion of the private key identified via the key ID and an authorization to access a container portion of the private key stored locally in the container;

combining the cloud portion of the private key with the container portion of the private key to construct the private key;

sending, by the security agent on the client device to the authentication server, a request to validate a second one-time password, wherein validation of the second one-time password by the authentication server authorizes exportation of the container portion of the private key from the container to a second device;

receiving, by the security agent on the client device, a response from the authentication server indicating that the second one-time password is valid, wherein exportation of the container portion of the private key to the second device is permitted upon receipt of the response; and exporting, from the security agent on the client device to the second device, the container portion of the private key.

12. The non-transitory computer readable storage medium of claim 11, wherein the set of operations further comprises:
executing an initial key generation function; and
sending the cloud portion of the private key to the authentication server.

13. The non-transitory computer readable storage medium of claim 11:
sending a request from to the authentication server to validate a third one-time password for importation of the container portion of the private key from a device into the container; and
receiving a response from the authentication server indicating that third the one-time password for importation of the container portion of the private key is valid, wherein importation of the container portion of the private key from the device is permitted upon receipt of the response.

14. The non-transitory computer readable storage medium of claim 11, wherein the key ID is one of a plurality of key IDs associated with the user ID.

15. The non-transitory computer readable storage medium of claim 11, wherein a pin policy defining requirements for the pin is exported with the container portion of the private key.

* * * * *